United States Patent [19]
Kelm

[11] 3,966,496
[45] June 29, 1976

[54] ELECTRODE ASSEMBLY FOR AIR DEPOLARIZED CELLS

[75] Inventor: Roger W. Kelm, Emerald, Wis.

[73] Assignee: Gould Inc., St. Paul, Minn.

[22] Filed: Aug. 30, 1974

[21] Appl. No.: 502,050

Related U.S. Application Data

[63] Continuation of Ser. No. 279,028, Aug. 9, 1972, abandoned.

[52] U.S. Cl. ......................... 136/86 A; 136/120 FC
[51] Int. Cl.² .......................................... H01M 4/00
[58] Field of Search ............... 136/86 A, 36, 134 R, 136/28, 120 FC; 113/119

[56] References Cited
UNITED STATES PATENTS

| | | | |
|---|---|---|---|
| 2,333,966 | 11/1943 | Weiss | 218/1 |
| 2,708,211 | 5/1955 | Koren et al. | 136/28 |
| 2,861,115 | 11/1958 | Berg | 136/28 |
| 3,518,123 | 6/1970 | Katsoulis et al. | 136/86 A |
| 3,632,449 | 1/1972 | Yardney | 136/86 A |
| 3,703,358 | 11/1972 | Carson et al. | 136/86 A |
| 3,713,892 | 1/1973 | Moran | 136/86 A |

Primary Examiner—John H. Mack
Assistant Examiner—H. A. Feeley
Attorney, Agent, or Firm—Jacobson and Johnson

[57] ABSTRACT

An electrode assembly for an air depolarized cell in which an electrical conducting tab is mechanically attached to the electrode assembly to produce a low resistance electrical connection. The tab includes a crown which has sharp tines thereon for piercing the electrode assembly which generally comprises a separator, a current collecting screen, an electrode material and an outer hydrophobic member. The projections on the conducting tab are wide enough to insure that each of the tines will engage a section of current collecting screens.

23 Claims, 8 Drawing Figures

ELECTRODE ASSEMBLY FOR AIR DEPOLARIZED CELLS

This is a continuation of application Ser. No. 279,028, filed Aug. 9, 1972.

BACKGROUND OF THE INVENTION

1. Field of the Invention

This invention relates generally to means and methods for attaching conducting tabs or external terminals to air depolarized electrode assemblies and, more specifically, to attaching an electrical lead to the cathode assembly of a zinc air cell.

2. Description of the Prior Art

The formation of electrode assemblies with conducting tabs is old in the battery art. A typical example of the method of fabricating or attaching a tab to an electrode or battery plate is shown in the Berg Pat. No. 2,861,115 which is assigned to the same assignee as the present invention. Berg shows a battery plate for an alkaline storage battery in which the electrode comprises nickel powder or plaque surrounding a nickel coated screen or grid. An electrical tab is connected to the battery plate by compressing or coining a portion of the plate and then forcing the crowns on the conducting tab therethrough. In the final step of the assembly, the tab is welded or fused to the screen to produce a low resistance electrical connection. In the Berg process the tines apparently allow gas to escape thus making it feasible to weld the tabs to the screen. While this process and apparatus work well for alkaline battery electrodes, the process of coining or compressing a portion of the electrode assembly of an air depolarized cell and then fusing a tab to the screen has proved unsatisfactory for the electrode assemblies of air depolarized cells. Typically, the air depolarized electrode comprises a separator on one side which is adjacent to a conducting screen that contains an electrode mixture such as carbon and a catalyst dispersed throughout the screen as well as above the screen. Located on the top of the screen is a layer of hydrophobic material that prevents escape of liquid therethrough but allows air to enter the electrode.

The difficulty in forming a low resistance electrical connection to an electrode assembly for air depolarized cells is that the assembly has a nonconducting separator on one side of the grid and a nonconducting hydrophobic member on the other side of the grid. Thus, the electrode assembly is not susceptible to a coining or compacting proess to form a conducting region for receiving a tab with crowns. Also, because of the insulating layers on the outside of the electrode assembly, the fusing operation cannot produce a low resistance electrical connection. Thus, to weld the tab to the crown, the separator material or hydrophobic member must be removed or stripped away if an electrical connection is to be formed between the screen and the tab. Also, because the separator and hydrophobic member are somewhat resilient, it is difficult to force the tines of the crown through either the separator or the hydrophobic member. That is, unless certain precautions are taken, the tines will bend or push the separator against the collecting screen thus providing an inadequate electrical connection.

Thus, to date, in order to form a low resistance electrical connection with the electrode comprised of a separator and carbon catalyst, dispersed around the electrode, it is necessary to take certain precautions. First, the separator and the hydrophobic member must be stripped or cut away in the region where the connection is to be made. Next, the electrode material adjacent and on the current conducting screen must be thoroughly cleaned. Then one can weld the tab to the screen. In addition, if welding or fusing is used, it should be done in the presence of an inert gas such as helium to prevent any carbon on the electrode assembly from burning during the welding operation.

Still another method for forming a low resistance electrical connection is to cut away a portion of the separator, the electrode material and the hydrophobic membrane and attach the tab by mechanically connecting the tab to the screen. However, both welding and fusing in this manner are very time consuming and sometimes difficult to accomplish, thus precluding mass production of these units. Therefore, although possible to form low resistance electrical connections, it is both difficult and time consuming to fasten a connector to the current collecting screen of an electrode assembly.

In still another prior art process, a portion of the screen is extended so it projects beyond the electrode assembly to be used for fastening a tab thereto. However, even if the screen extends beyond the electrode assembly, the normal handling during manufacture of the electrode assembly requires one to clean the screen before one can form a low resistance electrical connection thereto.

In still another embodiment, a portion of the screen is used as the external connector by allowing it to extend beyond the cell.

In still another method of forming a low resistance electrical connection, an electrode pin is inserted through the screen and through the electrode assembly to produce a low resistance electrical connection between the screen and the pin. This technique is described in the co-pending application of Arthur M. Jaggard, Ser. No. 229,274, filed Feb. 25, 1972, titled "Assemblying Electrodes in Electrochemical Cells", which is assigned to the same assignee as the present invention.

Thus, most prior art techniques for providing a connection to the electrode assembly of a cathode of a zinc air cell have been particularly cumbersome and difficult to achieve because of the requirement and necessity of cleaning the surface of the conducting screen before forming a connection to the electrode.

The present invention eliminates the prior art problems by utilization of a tab having crowns thereon which contain cutting edges for piercing the separator, current collection screen and the hydrophobic member. The electrode assembly can thus be fastened to the conductor by positioning the electrode assembly above a tab with a crown and forcing the tines or prongs of the crowns through the entire electrode assembly.

It has been discovered that this process, without any further application of fusing, cleaning, etc., produces a low resistance electrical connection between the screen and the tab. In addition, the use of more than one set of crowns provides torsional resistance to the tab thus making it sturdier for handling in the unassembled state.

SUMMARY OF THE INVENTION

Briefly, the invention comprises an improved electrode assembly for an air depolarized cell in which a multilayered electrode assembly and an electrical lead or conducting tab having a crown with sharp tines is mechanically connected to a current collecting screen in the electrode assembly in a single operation.

BRIEF DESCRIPTION OF THE DRAWINGS

Referring to the drawing.

DESCRIPTION OF THE PREFERRED EMBODIMENT

Figure 1:
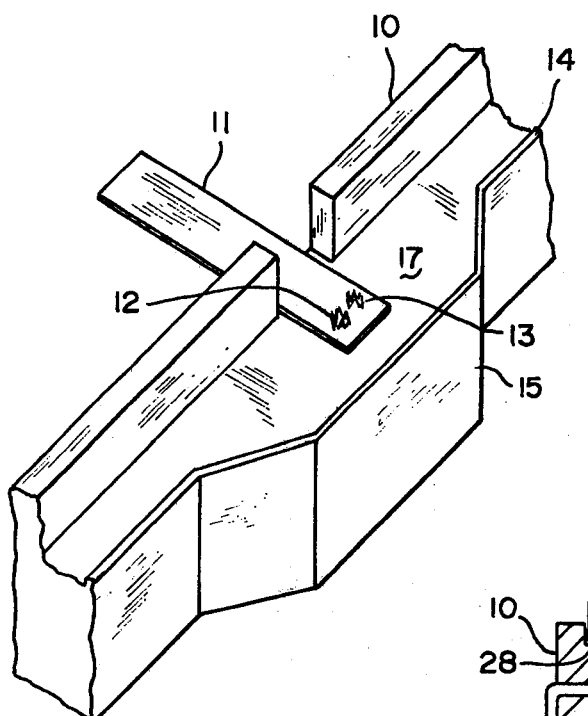
FIG. 1 shows a perspective view of an air depolarized battery housing and tab with its crowns projecting up to receive an electrode assembly.

Referring to FIG. 1, reference numeral 10 generally designates a housing for supporting an electrical conducting tab 11. Electrical conducting tab 11 has a pair of crowns 12 and 13 thereon. Preferably, electrical conducting tab 11 comprises a material such as brass or nickel or nickel coated steel. If the electrical conducting tabs are made from brass, the electrical conducting tab 11 and crowns 12 and 13 are coated with a flash coating of material such as silver to prevent oxidization of the brass in the presence of the potassium hydroxide electrolyte that is used with some electrode assemblies. While a variety of conventional materials may be used in the electrical conducting tab, it is preferred to use brass material because of its pliability and residual strength. That is, by a mechanical punching operation, one can form crowns that contain sharp tines which can pierce and cut through the electrode assembly while simultaneously forming a low resistance electrical connection with the current collecting screen in the electrode assembly.

Housing 10 also includes a heat sealing bead 14 and a protrusion 15 on the inside of the housing. The protrusion 15 projects into the cell to provide a support surface 17 for receiving tab 11. When the cell is assembled, the electrode assembly is placed on top of surface 17 and a heat sealing bead on the outer housing (not shown) is compressed against the electrode assembly. The feature of compressing the housing against the electrode assembly will be described in reference FIG. 2, however, FIG. 1 illustrates that conducting tab 11 is located outside the sealed section of the electrode assembly thus virtually eliminating problems of leakage of the electrolyte around tab 11. That is, a housing member, which is heat-sealed along the edges of the electrode assembly, prevents the free flow of liquid electrolyte into the area immediately adjacent connecting tab 11 and retards flow of electrolyte around tab 11. A more thorough explanation of this type of heat-sealed housing can be found in the co-pending application of Arthur M. Jaggard titled "Forming Sealed Housings for Electrochemical Cells", Ser. No. 229,416, filed Feb. 25, 1972, which is assigned to the same assignee as the present invention.

Figure 2:
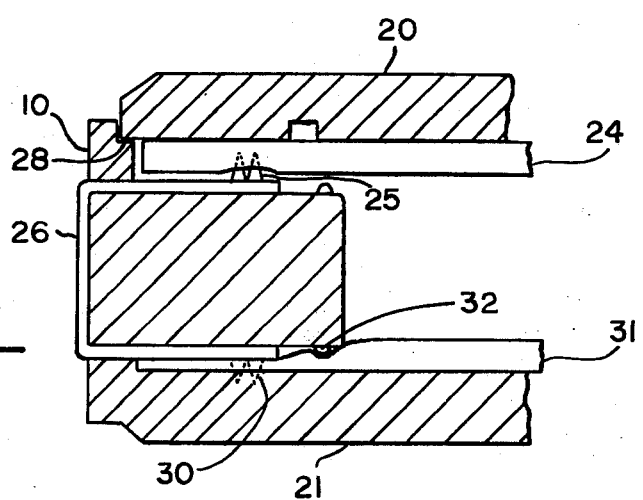
FIG. 2 is a cross-sectional view of a U-shaped tab having crowns projecting therefrom for engaging multiple cathodes of a multiple cathode battery.

Referring to FIG. 2, there is shown a cross-sectional view of housing 10 with an unsealed top housing member 20 and a lower housing member 21 which has been heat-sealed to housing member 10. One of the purposes of FIG. 2 is to illustrate two conditions of the mating housing members 20 and 21, i.e., the assembled condition and the partially assembled condition. In the partially assembled condition, an electrode assembly 24 is shown located on top of the tines 25 of the U-shaped connector 26. Tines 25 are shown projecting partially into electrode assembly 24. Mating housing member 20 which is to be heat-sealed to housing section 10 is shown resting on the edge of a melt bead 28. This is the unassembled appearance of housing 10, mating member 20 and electrode assembly 24 prior to the step of simultaneously heat sealing the housings together and forming a low resistance electrical connection between the current collecting screen in the electrode assembly 24 and metal conducting tab 26. To illustrate the assembled condition, housing 10 and lower mating housing member 21 are shown fused together by a suitable process such as heat-sealing or solvent sealing. In this condition, crown tines on tab 26 project through electrode asembly 31 and into mating housing member 21. In this particular embodiment, an electrolyte seal is formed around the edges of the electrode by the heat-sealing process which is described more fully in the aforementioned Jaggard patent application. As can be seen in this particular embodiment, the tines of crown 30 project through the electrode assembly and into housing 21 to anchor the conducting tab to the cell housing as well as the electrode. Thus, this technique provides an assembly process in which one can simultaneously form an electrical connection to the current collecting screen and seal the housing sections together.

Figure 3:
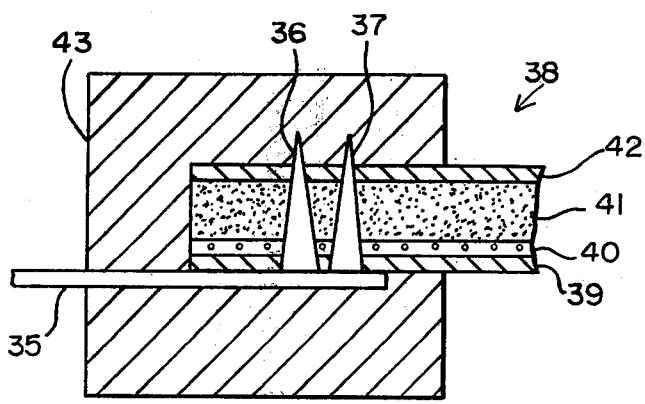
FIG. 3 is a cross-sectional view illustrating the projection of the tines through the electrode assembly and into the housing.

Referring to FIG. 3, there is shown an enlarged view of an electrical tab 35 having a first tine 36 and a second tine 37 which are shown projecting through an electrode assembly 38. Although only two tines are shown, it is preferable to have at least four tines per crown to insure that sufficient contact is made with the electrode assembly. A sealed housing 43 surrounds electrode assembly 38 and tab 35. A typical electrode assembly utilized with the invention comprises an insulator or separator 39 which is made from polypropylene or a polyamide material such as Dynyl, a metal current collector member 40 which is preferably a screen made from nickel or a screen that is nickel coated, an electrode material 41 such as carbon, a suitable catalyst, and a hydrophobic layer 42 located on the outside of electrode assembly 38. The current collecting member could also be a conducting foil or sintered metal collector having openings therein, however, the screen is preferred. The hydrophobic layer is well known and is extensively used in the operation of air depolarized cells to prevent the loss of electrolyte and liquid to the atmosphere surrounding the cell. A typical hydrophobic layer is made from polytetrafluoroethylene, however, other materials are also suitable. Note, the utilization of an electrical conducting tab 35 with tines that pierce this layer would appear to negate the significance of the hydrophobic layer, however, this electrode configuration does not reduce the effectiveness of the hydrophobic layer as a liquid barrier because the electrode assembly and the conducting tab are outside the sealed area of the electrode assembly (FIG. 1).

Figure 4:
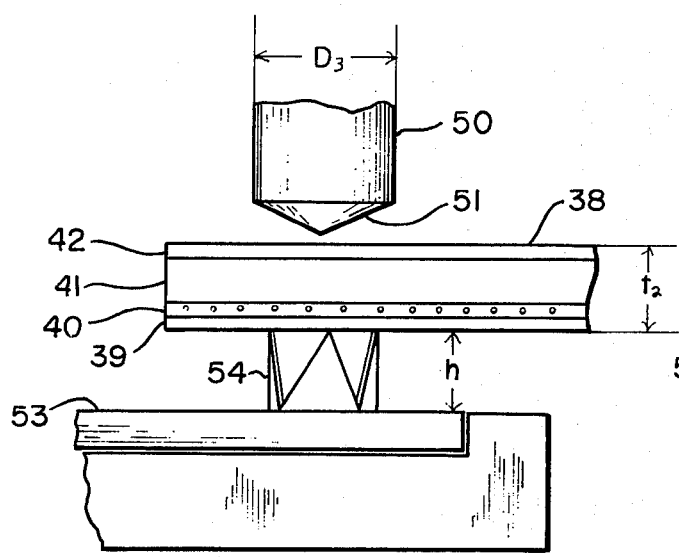
FIG. 4 is a similar cross section view illustrating the tines of the crown as they are about to pierce the electrode assembly and the use of a center punch for forcing the electrode assembly through the tines.

Referring to FIG. 4, there is shown another assembly process for an electrode assembly and an electrically conducting tab. In this process of the invention, a cylindrical punch 50, of diameter $D_3$ and having a tapered section 51, is about to contact an electrode assembly 38 which is partially supported on the sharp tines 54 on electrical conducting tab 53. Punch 50 may have a flat bottom instead of the tapered configuration as shown in FIG. 4. Also, punch 50 may have other shapes than cylindrical, cylindrical being the preferred embodiment. The electrode assembly has a thickness which is designated by $t_2$ and the height of the tines which project above tab 53 is designated by $h$. In the assembly of this process, the distance $h$ is about equal to or greater than the thickness $t_2$ to allow for clinching of the tines. In this embodiment, the electrode assembly is identical to that shown in FIG. 3 and comprises screen 40 which is located adjacent to the separator layer 39, a carbon electrode material 41 located on top and throughout the screen 40 and a hydrophobic layer 42. In this particular embodiment, the screen is adjacent to the separator which also places the widest portion of the crown tines nearest the screen 40 when assembled. In this method of forming a low resistant electrical contact, I have obtained excellent lateral contact between the wires in screen 40 and the base of tines 54. However, although this is the preferred assembly, one can insert the tines through the assembly from the side farthest from screen 40. The only precaution that needs to be taken is to insure that the tines are wide enough at the point of contact with screen 40 so that the tines laterally push against screen 40 and thereby produce a low resistance electrical connection thereto.

Figure 5:
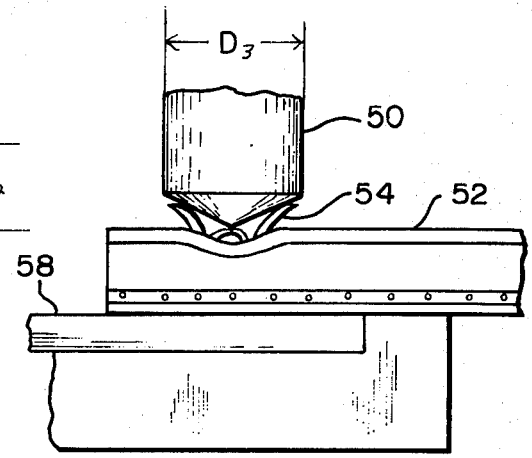
FIG. 5 shows the electrode assembly and a center punch clinching the tines.

In the next step of the assembly process, pin 50 is forced downward thereby forcing tines 54 through the electrode assembly 38. As the pin continues downward (FIG. 5), it clinches or bends tines 54 outward thus mechanically engaging, locking and forming a low resistance electrical connection to the electrode assembly in one step. Once the pressure is removed from pin 50, the clinched tines insure the integrity of the connection and assembly.

Figure 6:
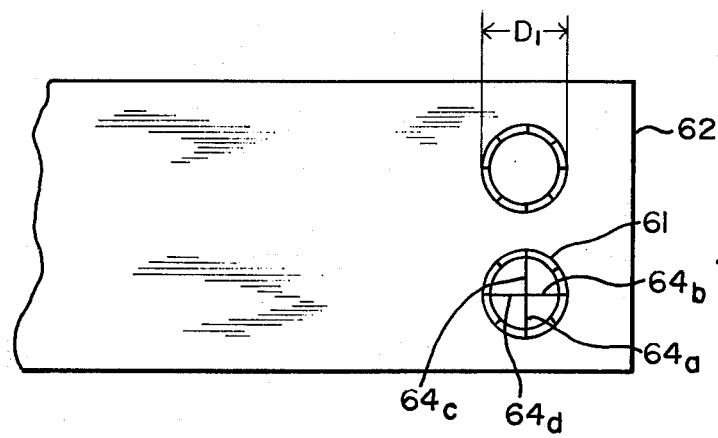
FIG. 6 shows a top view of tab with a punch extended therethrough.
Figure 7:
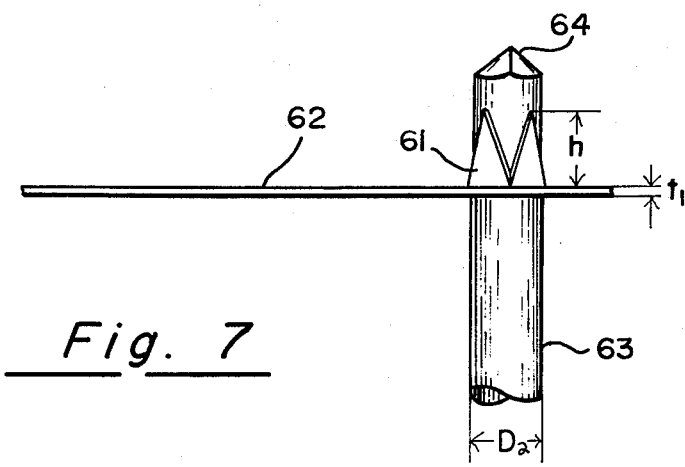
FIG. 7 shows a side elevation of FIG. 6 showing a punch extended through the tab.

Referring to the drawing shown in FIG. 6, the diameter of a crown is shown indicated by $D_1$. The clinching is performed by having the diameter $D_3$ of pin 50 greater than the diameter $D_1$ of the crown. FIG. 7 also shows the height of the crown tines indicated by $h$ and the thickness of the electrical tab material indicated by $t_1$. FIG. 6 and FIG. 7 also illustrate the process of forming a crown with sharp tines therein. Located through tab 62 is a punch 63 having a diameter designated by $D_2$. Punch 63 has a working face or head 64 with four sections thereon which are separated by ridges 64a, 64b, 64c and 64d that radiate from the center of punch 63. It is these ridges that make initial contact with tab 62 to produce a cutting or shearing action that separates the tab in a crown 61 having four segments or wedge shaped tines. In the punching operation, punch 63 is extended completely through tab 62 so that the tines on the crown are parallel to the surface of the punch. Thus, when the punch is inserted at a right angle to tab 62, the crowns will also be at a right angle to tab 62. While the dimensions can vary within certain ranges, certain relationships should be maintained in order to obtain the desired low resistance electrical connection between the screen and the projections of the tab. The following examples are given to illustrate the various relationships.

EXAMPLE OF ELECTRODE ASSEMBLY

An electrical conducting tab having a thickness $t_1$ of 0.008 inches and a width of about 0.250 inches was formed in brass. While an 0.008 inch connecting tab was selected, tabs as thin as 0.0005 inches and as thick as 0.010 inches are within the preferred range of materials. In fact, thicker or thinner materials could be used but the thicker materials become difficult to form a crown on as the material does not punch through cleanly to form a set of sharp tines. Similarly, if the tab is too thin, the tines on the crown will have insufficient structural strength to pierce the electrode assembly. With an 0.008 inch tab, a punch having faces or separating lines at 90° intervals (FIG. 6), much in the shape of a pyramid is forced through the tab. A suitable diameter $D_2$ of the punch is about 0.070 inches. With this size tab and the aforementioned punch dimensions, one can form a crown with four tines that project a distance $h$ which is about 0.040 inches above the surface of the tab.

While square, hexagonal and other shape punches can be used to form the tines and the opening, it is preferred to use a circular punch because it produces a stronger and more rigid crown.

In forming the tines, the punch is pushed completely through the tab at a right angle to the tab. This forces the tines to project from the tab at substantially a right angle. With the tines substantially perpendicular to the tab, the tines can pierce or cut through the electrode assembly without bending. If the tines bend over in assembly, it produces an inferior electrical connection.

With the tab having the above-described dimensions, a typical screen having 40 wires per inch with a diameter of 0.006 inches produces an interference fit between at least a portion of the tines and the screen wires. That is, each of the tines has a portion of its dimension which is larger than the openings in the collector screen. This insures that each tine will force itself into contact with at least two wires of the current collecting screen. With these particular tab dimensions and a single crown of four tines, I have formed an electrical connection capable of withstanding 1:5 amps without damaging the connection.

Figure 8:
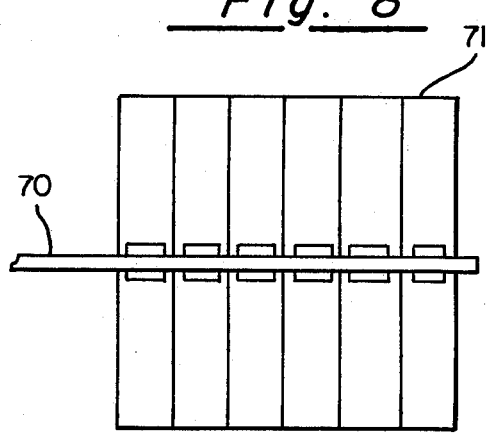
FIG. 8 shows a battery with multiple electrode assemblies that utilize the electrical conducting tab of this invention.

Typically, with this size tab I use an electrode assembly having a thickness of approximately 0.020 inches to 0.030 inches. Thus, in this embodiment the tines will project through the electrode assembly where they can either be clinched or embedded in the housing. Having formed the electrical conducting tab with the above crowns, I can then insert the electrical connecting tabs in the cells and assemble the cell housing as described previously. Once the cells are assembled I can collect the individual cells together by a common connector. FIG. 8 shows a multiple battery embodiment of the invention in which the electrical conducting tabs of cells 71 are connected together by a common electrical connector 70.

I claim:

1. An electrode assembly for an air depolarized cell comprising:

an electrode assembly of predetermined thickness including a current collecting member having openings of a predetermined size, an electrode material dispersed throughout said current collecting member and a first insulating member located on one side of said electrode assembly and a second insulating member located on the second side of said electrode assembly;

an electrical conducting tab for forming a low resistance electrical connection to said current collecting member through said insulating layers, said electrical conducting tab having tines suitable for penetrating through said electrode assembly, and said insulating layers, said electrically conducting tab overlaying one of said insulating layers and spaced from said current collecting member with each of said tines projecting through an opening formed in said electrode assemby by each of said tines, said tines having at least a portion of said tines engaging said current collecting member to thereby form a low resistance electrical connection thereto.

2. The invention of claim 1 wherein said electrode assembly comprises the cathode assembly of a metal air battery.

3. The invention of claim 1 including a second electrode assembly connected to said electrical conducting tab.

4. The invention of claim 1 wherein said electrode assembly and conducting tab are mounted in a heat-sealed housing.

5. The invention of claim 3 wherein said conducting tab has a U-shape for attachment to said electrode assemblies.

6. The invention of claim 1 wherein the tines have a length that at least is equal to the thickness of said electrode assembly.

7. The invention of claim 1 wherein a plurality of crowns are located in said electrical conducting tab to provide a torque resistance tab.

8. The invention of claim 1 wherein said tines on said electrical conducting tabs are clinched.

9. The invention of claim 1 wherein the tines are embedded in said housing member.

10. A metal air battery for the generation of electricity comprising:
   a battery housing;
   an anode;
   a cathode assembly comprising a separator, a current collecting member, an electrode material dispersed through said current collecting member and a hydrophobic layer; said separator located on one side of said current collecting member and said hydrophobic layer located on the opposite side of said current collecting member;
   an electrical conducting tab sealed into said housing; and spaced from said current collecting member by a hydrophobic layer, said electrical conducting tab including a crown having projecting tines, said tines projecting through said cathode assembly including said hydrophobic layer so that at least a portion of the tines electrically engage said current collecting member.

11. The invention of claim 10 wherein the crowns have a height $h$ and the electrode assembly has a thickness $t_2$ which is less than the height $h$.

12. The invention of claim 11 wherein the conducting tab comprises brass having a flash coating of silver thereon.

13. The invention of claim 12 wherein the thickness of the tab ranges from 0.0005 inches to 0.010 inches.

14. The invention of claim 13 wherein the current collecting member comprises a screen.

15. The invention of claim 14 wherein said tines project through the electrode assembly and are clinched to firmly hold said electrical conducting tab to said electrode assembly.

16. The invention of claim 15 wherein the tines on said crown are wedge-shaped and are located on a circular pattern in said tab.

17. The invention of claim 16 wherein said tines are substantially perpendicular to said tab.

18. The invention of claim 17 wherein said electrical connection consists solely of the pressure contact between said current collecting member and said tines.

19. The process of forming an electrode assembly for an air depolarized cell comprising:
   sandwiching together a separator, an active electrode material, a current collecting member and a hydrophobic member to thereby form an electrode assembly having a separator on one side and a hydrophobic member on the opposite side;
   forming a substantially flat electrical conducting tab;
   first piercing said conducting tab with a punch of predetermined size to thereby produce sharp segmented wedge shaped tines that project substantially perpendicular to the electrical conducting tab;
   then forcing the tines through the electrode assembly, and said hydrophobic member to thereby produce a low resistance electrical connection between said current collecting member and said tines.

20. The invention of claim 19 including the step of clinching the tines against the electrode assembly.

21. The invention of claim 20 including the step of simultaneously piercing the electrode assembly and clinching the tines.

22. The invention of claim 19 including the step of heat sealing a housing member around the electrode assembly.

23. The invention of claim 22 including the step of connecting said electrical conducting tab to a second electrode assembly.

* * * * *